A. WRIGHT.
MOVING PICTURE PROCESS AND APPARATUS.
APPLICATION FILED SEPT. 8, 1913. RENEWED MAY 19, 1917.
1,251,161.
Patented Dec. 25, 1917.
2 SHEETS—SHEET 1.
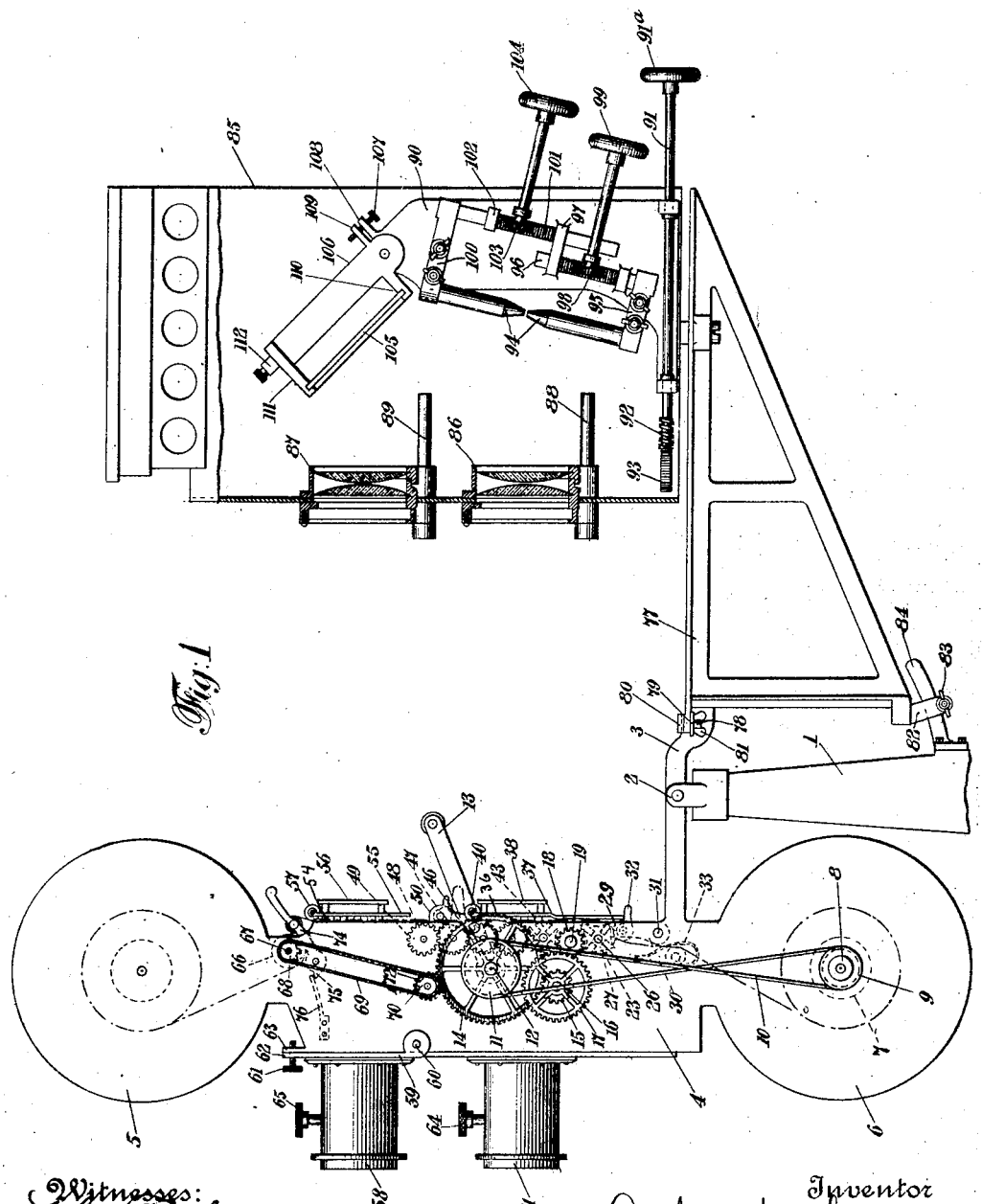

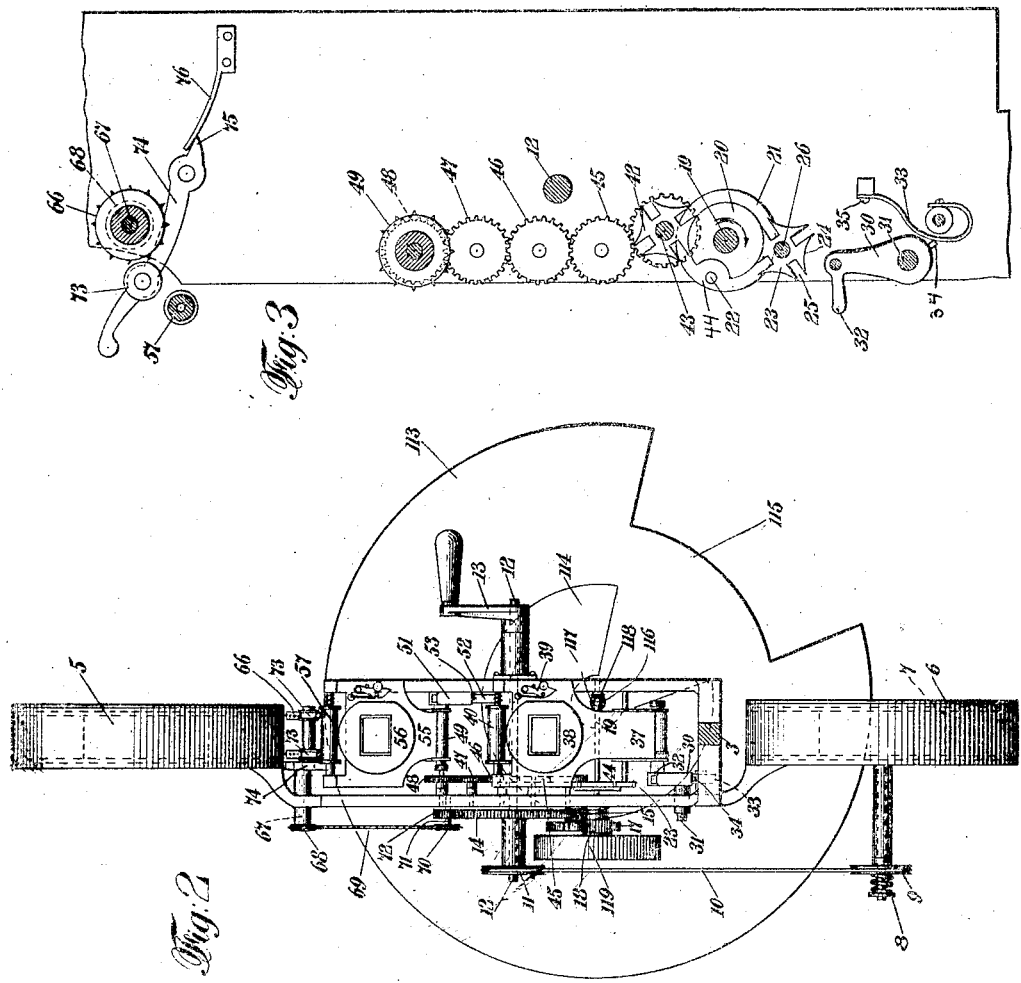

UNITED STATES PATENT OFFICE.

ARTHUR WRIGHT, OF NEW YORK, N. Y.

MOVING-PICTURE PROCESS AND APPARATUS.

1,251,161.　　　　　Specification of Letters Patent.　　Patented Dec. 25, 1917.

Application filed September 8, 1913, Serial No. 788,523. Renewed May 19, 1917. Serial No. 169,778.

*To all whom it may concern:*

Be it known that I, ARTHUR WRIGHT, of New York, in the county of New York, and in the State of New York, have invented a certain new and useful Improvement in Moving-Picture Processes and Apparatus, and do hereby declare that the following is a full, clear, and exact description thereof.

My invention relates particularly to projecting machines for motion pictures which will produce moving pictures free from the flickering effect.

Hitherto motion pictures have been produced customarily by projecting one picture after another in a single sequence of pictures, said pictures being projected so rapidly as to give the effect of motion. These pictures have been projected from a single strip of film carrying a single sequence of pictures. For this reason and owing to the fact that it is necessary to retain a particular picture at rest while it is being projected, it has been necessary to entirely cut off the light between the projections of the successive pictures so that an entirely black unilluminated surface has appeared upon the screen between the successive projections of pictures. This is the cause of the well-known flickering effect. The flickering effect is such a great disadvantage in motion pictures that very many persons will not view them, owing to the eye strain involved. Furthermore, the flickering effect is the principal remaining element in the projection of motion pictures which gives an appearance of unreality to the pictures. In order to render less disagreeable the flickering effect present in the previous production of motion pictures, motion picture machines have been customarily equipped with additional vanes on the shutters in order to not only interrupt the light and discontinue the projection of a particular picture between successive pictures, that is to say, while the film is being moved from one position to the other, but for the purpose of interrupting the light and discontinuing the projection at intervals during the projection of a particular picture. For this reason the shutter has not only been provided with the vane used for cutting off the light while the film is being moved from one position to the next position, but it has been provided also with one or more additional vanes. Usually such vanes have been three in number so as to divide the entire area of the shutter into six different areas of approximately 60° each, three of the areas being occupied by the vanes and three being open to permit the projection of pictures. It will therefore be seen that in the projection of pictures as previously carried out the light is removed from the screen approximately one half of the time.

The object of my invention is to provide a motion picture projecting machine which is adapted to project pictures from a strip of film which may carry a single sequence of pictures in such a manner as to entirely do away with the flickering effect. An apparatus made in accordance with my invention will therefore avoid all of the above disadvantages. A projecting machine made in accordance with my invention will project pictures in such a manner as to do away with the customary eye strain. Furthermore, it will produce pictures having a far greater degree of reality in their appearance, inasmuch as the pictures will be produced without the disconcerting change of intensity of the light and without the unilluminated intervals which are frequently very disturbing and which are calculated to divert the attention of the observer from the subject-matter of the picture.

Again, motion pictures projected with my machine will be at least twice as brilliant as pictures projected by previous machines, inasmuch as the total amount of light thrown upon the screen by my projecting machine is doubled. My projecting machine will therefore accomplish not only the result of avoiding the flickering effect which is so unpleasant in the projection of motion pictures as hitherto carried out, but will produce "day-light pictures" far better than previous devices.

Again by the use of my projecting machine the film can be run more slowly than in previous projecting machines. For this reason shorter films may be used for a given subject and longer subjects can be produced on films of a given length than previously. This makes my invention particularly advantageous in projecting colored pictures as owing to the slowness with which the pictures can be run the disadvantages due to high speed in projecting colored moving pictures are avoided.

While my invention is capable of embodiment in many different forms, for the purpose of illustration I have shown only one form herein, in which—

Figure 1 is a side elevation of a projecting machine made in accordance with my invention, Fig. 2, is a rear elevation of the same, and Fig. 3, is a vertical section of the same.

In the drawings, I have shown a stand or pedestal 1 of any desired character, having at its top a pair of ears 2 to pivotally support a main bracket 3. This bracket 3 is connected to a main frame 4 of any desired character for supporting the moving parts of the projecting machine. Attached to the top of the frame 4 there is a reel box 5 of any desired type, and attached to the bottom thereof I have provided a reel box 6 of any desired character. The film is preferably fed downwardly from the reel box 5 and into the reel box 6. The reel box 6 is therefore provided with a spool 7 loosely carried by an axle 8 passing through the same, said axle 8 having a pulley 9 secured thereto. Any desired type of friction pressure apparatus may be provided between the axle 8 and pulley 9 and the spool 7 so as to permit the spool 7 to yield more or less according to the varying size of the roll of film upon the spool. The pulley 9 is driven by a band 10, which passes around a driving pulley 11, situated upon a main driving shaft 12. The main driving shaft 12 may be driven manually by a hand crank 13 or by any other suitable source of power. Upon said shaft 12 I have also provided a gear 14, which meshes with a gear 15 upon a shaft 16, gears being supported in the main frame 4. The shaft 16 is also provided with a larger gear 17, which meshes with a gear 18, also supported in the main frame upon a stud shaft 19. The shaft 19 carries one element of a Geneva stop movement which, in this instance, is a wheel comprising a disk 20, formed on the face of a larger disk 21, said larger disk having a pin or stop 22. The disk 20 and the pin 22 are designed to coöperate with another member of the Geneva stop movement, comprising a wheel 23 in the shape of a cross and having surfaces 24 to fit over the edge of the disk 20 and slots 25 to coöperate with the pin 22. By this means the wheel 23 will alternately be rotated and remain stationary. Said wheel 23 is supported upon a shaft 26, which carries a feed roller 27 provided with teeth 28 to fit in the holes of the film. A guide roller 29 is supported adjacent to the surface of the feed roller 27 by being supported upon a lever 30, pivoted upon an axle 31 supported in the main frame. The lever 30 has a laterally directed tongue 32 to enable the roller 29 to be withdrawn when desired against the force of a spring 33, which presses against a lug 34 attached to the lever 30. The spring 33 is supported from the main frame 4 by a screw 35, or in any other suitable manner. The film is thus fed downwardly, intermittently by the feed roller 27, which coöperates with the guide roller 29 and by this means the film is moved in such a manner as to bring one picture after another in front of the main projecting lens so as to produce a sequence of pictures on the screen to give the effect of motion. This film is moved downwardly in the manner indicated between a base 36 and a door 37 hinged to one side of said base 36. The door 37 carries a frame 38 for admitting light to the film. A spring-pressed catch 39 maintains the door 37 in closed position. Before the film reaches the base 36 and the door 37, it passes over a guide roller 40, which is carried in pivots upon the upper end of the door 37. On the front of the main frame 4 I provide a main lens 41 for projecting the pictures from the portion of the film located between the base 36 and the door 37. In the intervals between the projection of the successive pictures through the lens 41, that is to say, during the times when the film is being moved from one position to another, one of the other pictures of the series is projected upon the screen. In order to accomplish this end, I provide an additional wheel 42, similar in shape to the wheel 23 and adapted to coöperate with the disk 20 and the pin 22, but in such a manner that the wheel 42 is moved while the wheel 23 is at rest and vice versa. This wheel 42 is carried upon a stud shaft 43 in the main frame 4, said shaft having also a gear 44, which drives a series of gears 45, 46, 47 and 48 carried upon shafts attached to the main frame 4. The gear 48 is supported upon a stud shaft, which carries a feed roller 49 similar in construction to the feed roller 27, and run at the same speed as the same. This feed roller coöperates with a guide roller 50 supported upon a lever 51 similar to the lever 30 and normally pressed against the feed roller 49 by a spring 52 coöperating with a lug 53 upon one of the levers. The feed roller 49 and the guide roller 50 feed the film downwardly, intermittently during the intervals when the feed roller 27 is at rest, so that thereby the film is intermittently drawn downwardly between a base 54 and a door 55 hinged thereto. Upon the door 55 there is a frame 56, similar in construction to the frame 38. Attached to the top of the door 55, there is also a guide roller 57, similar to the guide roller 40. A lens 58 projects the pictures from the portion of the film, which is located between the base 54 and the door 55. Said lens 58 is pivotally supported upon a carriage 59, situated upon the main frame 4 in such a manner that the lower portion thereof is carried upon pivots 60, while the upper portion thereof is retained in position by an adjusting screw 61, passing through ears 62 and 63, located upon the carriage 59 and the main frame 4, respectively. Adjusting screws 64 and 65 are provided for the lenses 41 and 58, respectively, so as to change the focus of the projected pictures upon the screen. In order to feed the film downwardly from the upper reel box 5, I provide a feed roller 66, carried upon a stud shaft 67, said shaft having a pulley 68 which is connected by a band 69 to a pulley 70 on a stud shaft 71 in the main frame 4 and having a gear 72, which meshes with the gear 14. Coöperating with the feed roller 66, there is a guide roller 73, supported in pivoted arms 74, pivoted to the main frame 4 and having a lug 75 adjacent to a spring 76 for normally pressing the guide roller 73 into coöperation with the feed roller 66. To the rear of the main bracket 3 I attach a rear bracket 77 by means of a vertical pivot 78. An ear 79 attached to the main bracket 3 and a similar ear 80 attached to the bracket 77 are arranged with registering slots to receive a thumb screw 81, so as to adjust the relative positions of the main bracket 1 and the rear bracket 77 and maintain them in their adjusted position. At the bottom of the rear bracket 77 I provide a slotted extension 82, having a split end and an adjusting screw 83, said slotted extension being designed to receive a tongue 84 extending laterally from the pedestal 1. A housing 85 for the lighting apparatus is provided at the rear of the bracket 77 so as to be adjustably fixed thereon in any desired manner. Condensers 86 and 87 are provided at suitable elevations opposite the lenses 41 and 58. These condensers are supported upon horizontal slide bars 88 and 89 so as to permit the condensers to be adjusted as desired. In the rear of the housing 85 I provide a sliding bracket 90, which is adapted to be adjusted forwardly and rearwardly by means of a hand operated screw 91, having a hand operating wheel 91ª, said screw carrying a worm wheel 92, which coöperates with a rack 93 fixed to the inside of the housing 85. Said sliding bracket 90 has means for supporting adjustable carbons 94. The lower carbon 94 is supported in an adjustable bracket 95 of the usual kind, which bracket 95 is secured to a sliding rack 96, carried in guide ways 97, attached to the bracket 90. The rack 96 is moved by a gear 98, which is operated by a hand wheel 99 supported upon the bracket 90. A similar adjustable bracket 100 is provided for the upper carbon 94, said adjustable bracket 100 being supported upon a vertically movable rack 101, carried in the guide ways 97 and additional guide ways 102. A gear 103 is provided for moving the rack 101 as desired, the same being connected with a hand-operating wheel 104. At the top of the bracket 90, I support a mirror 105 by means of a pivoted support 106, which is adapted to be moved into any desired angular position by means of a screw 107, passing through an ear 108, upon the bracket 90 and a similar ear 109 upon the support 106. Said support 106 has a laterally directed recessed arm 110 to receive the lower edge of the mirror 105 and the upper edge of the mirror 105 is retained in place by a removable recessed arm 111, which arm is secured to the support 110 by a thumb screw 112. I also provide a shutter 113, which is arranged so as to exhibit pictures from the lenses 41 and 58 in the manner previously described. For this purpose the shutter is provided with an inner open portion 114 to receive pictures projected from the lens 41 and a similar marginal open portion 115 to receive pictures projected from the other lens 58. The shutter 113 is rotatably supported upon a shaft 116, which carries a beveled gear 117, meshing with a beveled gear 118, located upon the shaft 19. Said shaft 19 also carries at the end thereof a fly wheel 119.

The operation of my projecting machine is as follows: The apparatus is first set up in such a manner that the projections from the two lenses 41 and 58 will occupy the same rectangular field on the screen, and the various adjustable portions of the light projecting apparatus are adjusted in such a manner as to throw the light through the frames 38 and 56 so as to project the light through the lenses 41 and 58 up on the screen. The lower lens 41 is adjusted so as to throw a sharp picture upon the screen. The lens 58 may, however, also be focused to throw a sharp image on the screen but is preferably so focused, as to impair or destroy the definition of the image thrown upon the screen through the same. Furthermore, if so desired, the projected fields of light from this lens may be made somewhat larger or smaller on the screen. By this means the screen is provided with different areas lighted with the same relative intensities as when the screen is illuminated by the projection of an image through the lens 41. While the definition of the image thrown upon the screen through the lens 58 may be destroyed or impaired in the manner indicated, it is of course to be understood that this may be accomplished in any other desired manner. The pictures which are projected in this manner will appear as continuously moving pictures without any apparent variation in the light quantities upon the screen so that the flickering effect will be entirely removed. The pictures, furthermore, have such a smooth appearance as to give a greater appearance of reality than in the case of pictures projected with continual interruptions of the light. Again, as previously pointed out, the intensity of the image upon the screen will be practically doubled, thus producing exceedingly effective "daylight pictures". The light thrown upon the screen through the lens 58 will not produce the effect of pictures upon the eye, when viewed in connection with the projections from the lens 41, though they might produce such effect when viewed alone. This result will also be produced for the reason that the light from the lens 58 will be projected upon the screen only about one-sixth of the time, although this proportion may be varied at will, while the pictures from the lens 41 will be thrown upon the screen the remaining five-sixths of the time. This result will also be obtained because of the slightly less intensity of the light projected on the screen through the lens 58, as the light which reaches the condenser 87 from the carbons 94 is somewhat less than the light passing through the condenser 86.

Owing to the fact that the film may be run more slowly in my projecting machine shorter films may be used for a given subject and longer subjects may be produced for a given length of films. This adapts my invention particularly for use in connection with colored motion pictures as by its use the disadvantages of moving the films at high speed are avoided.

I have thus described one illustrative example of an apparatus which may be made in accordance with my invention, but it is to be understood that the details of the apparatus may be entirely reorganized, if desired, and changed in any desired way so as to add the usual attachments and appliances of many different kinds which are used on motion picture projecting machines, for example, it is to be understood that instead of projecting the subsequent pictures in the intervals between successive pictures, preceding pictures may be projected in such intervals, or both subsequent and preceding pictures may be projected simultaneously in said intervals.

Finally, it is to be understood that changes of many different kinds, of any desired character, may be made as to the details and arrangement of the apparatus above described without departing from the spirit of my invention.

I claim:

1. In combination, a projecting machine for projecting motion pictures from a sequence of pictures and means for projecting a picture like one in the sequence but out of its order in the interval of obscuration between successive pictures of the sequence.

2. In combination, a projecting machine for projecting motion pictures for a given length of time from a sequence of pictures and means for projecting a picture like one in the sequence but out of its order for a shorter length of time in the interval of obscuration between successive pictures of the sequence.

3. In combination, a projecting machine for projecting motion pictures with a given intensity and means for projecting a picture like one in the sequence but out of its order with a lesser intensity in the interval of obscuration between successive pictures of the sequence.

4. In combination, a projecting machine for projecting motion pictures for a given length of time and intensity from a sequence of pictures and means for projecting a picture like one in the sequence but out of its order for a smaller length of time and intensity in the interval of obscuration between successive pictures of the sequence.

5. In combination, a projecting machine for projecting motion pictures from a sequence of pictures and means for projecting a picture with impaired definition like one in the sequence but out of its order in the interval of obscuration between successive pictures of the sequence.

6. In combination, a projecting machine for projecting motion pictures for a given length of time from a sequence of pictures and means for projecting a picture with impaired definition like one in the sequence but out of its order for a shorter length of time in the interval of obscuration between successive pictures of the sequence.

7. In combination, a projecting machine for projecting motion pictures with a given intensity and means for projecting a picture with impaired definition like one in the sequence but out of its order with a lesser intensity in the interval of obscuration between successive pictures of the sequence.

8. In combination, a projecting machine for projecting motion pictures for a given length of time and intensity from a sequence of pictures and means for projecting a picture with impaired definition like one in the sequence but out of its order for a smaller length of time and intensity in the interval of obscuration between successive pictures of the sequence.

9. In combination, a projecting machine for projecting motion pictures from a single sequence of pictures by alternately stopping and moving the same and means for maintaining the screen continuously illuminated from some portion of the sequence of pictures while at rest comprising two alternately operable projecting devices one of which is adapted to project pictures for longer intervals than the other and the other to project pictures in the interval of obscuration.

10. In combination, a projecting machine for projecting motion pictures from a sequence of pictures and means for throwing on the screen in the interval between two successive pictures another picture of the series.

11. The process which comprises projecting motion pictures from a sequence of pictures, and projecting a picture like one in the sequence, but out of its order in the interval of obscuration between the successive pictures of the sequence.

12. The process which comprises projecting motion pictures from a sequence of pictures, and projecting a picture like one in the sequence, but out of its order for a shorter length of time in the interval of obscuration between the successive pictures of the sequence.

13. The process which comprises projecting motion pictures from a sequence of pictures, and projecting a picture like one in the sequence, but out of its order with a lesser intensity in the interval of obscuration between the successive pictures of the sequence.

14. The process which comprises projecting motion pictures from a sequence of pictures, and projecting a picture like one in the sequence, but out of its order, for a smaller length of time and intensity, in the interval of obscuration between the successive pictures of the sequence.

15. The process which comprises projecting motion pictures from a sequence of pictures, and projecting a picture with impaired definition like one in the sequence, but out of its order in the interval of obscuration between the successive pictures of the sequence.

16. The process which comprises projecting motion pictures from a sequence of pictures, and projecting a picture with impaired definition like one in the sequence, but out of its order for a shorter length of time in the interval of obscuration between the successive pictures of the sequence.

17. The process which comprises projection motion pictures from a sequence of pictures, and projecting a picture with impaired definition like one in the sequence, but out of its order, with a lesser intensity in the interval of obscuration between the successive pictures of the sequence.

18. The process which comprises projecting motion pictures from a sequence of pictures, and projecting a picture with impaired definition like one in the sequence, but out of its order, for a smaller length of time and intensity, in the interval of obscuration between the successive pictures of the sequence.

19. The process which comprises projecting motion pictures from a single sequence of pictures so as to produce the visual effect of motion by projecting the pictures in their sequential order and maintaining the sequence illuminated with substantially the same relative degrees of light and shadow as in the motion pictures in the periods of obscuration by projecting pictures from said sequence, but out of the sequential order in which they were projected to give the effect of motion.

In testimony that I claim the foregoing I have hereunto set my hand.

ARTHUR WRIGHT.

Witnesses:
VIOLET G. LLOYD,
SAMUEL SCHWARTZMAN.